United States Patent
Imai et al.

(10) Patent No.: US 11,215,521 B2
(45) Date of Patent: Jan. 4, 2022

(54) DETACHABLE PRESSURE DETECTION DEVICE

(71) Applicant: Surpass Industry Co., Ltd., Saitama (JP)

(72) Inventors: Hiroshi Imai, Saitama (JP); Kazuo Abo, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 31 days.

(21) Appl. No.: 16/705,738

(22) Filed: Dec. 6, 2019

(65) Prior Publication Data
US 2020/0182727 A1    Jun. 11, 2020

(30) Foreign Application Priority Data
Dec. 10, 2018 (JP) .............................. JP2018-231082

(51) Int. Cl.
*G01L 19/00* (2006.01)

(52) U.S. Cl.
CPC ............................... *G01L 19/0023* (2013.01)

(58) Field of Classification Search
None
See application file for complete search history.

(56) References Cited

U.S. PATENT DOCUMENTS

| 5,097,841 A * | 3/1992 | Moriuchi | A61B 5/0215 600/488 |
| 10,222,286 B2 | 3/2019 | Imai et al. | |
| 2010/0252491 A1 * | 10/2010 | Jurio | A61B 5/0215 210/137 |
| 2012/0240686 A1 * | 9/2012 | Blomberg | G01L 19/0645 73/756 |
| 2016/0377495 A1 | 12/2016 | Wu | |
| 2016/0377499 A1 | 12/2016 | Imai et al. | |
| 2018/0120186 A1 * | 5/2018 | Imai | G01L 19/14 |
| 2018/0238761 A1 | 8/2018 | Imai et al. | |

FOREIGN PATENT DOCUMENTS

| EP | 3367081 A1 | 8/2018 |
| JP | 2017009467 A | 1/2017 |

OTHER PUBLICATIONS

European Extended Search Report in corresponding European Application No. 19213228.0 dated May 25, 2020, 5 pages.

* cited by examiner

*Primary Examiner* — Lisa M Caputo
*Assistant Examiner* — Nigel H Plumb
(74) *Attorney, Agent, or Firm* — MH2 Technology Law Group LLP

(57) ABSTRACT

A flow passage unit is detachably mounted on a pressure detection unit and detects a pressure to be transmitted to a pressure detection part. The flow passage unit includes a flexible flow passage part including a flexible flow passage which introduces liquid, flowing in the flexible flow passage part from an inflow port, to an outflow port, and which is made of a flexible material. The flow passage unit also includes a body portion configured to form a pressure transmitting space which surrounds an outer peripheral surface of the flexible flow passage part. The flow passage unit also includes a pressure transmitting part mounted on the body portion and having a thin-film shape. One surface of the pressure transmitting part faces the pressure transmitting space, and the other surface of the pressure transmitting part is capable of coming into contact with the pressure detection part.

6 Claims, 12 Drawing Sheets

DETACHABLE PRESSURE DETECTION DEVICE

CROSS-REFERENCE TO RELATED APPLICATIONS

This application is based on Japanese Patent Application No. 2018-231082, the contents of which are incorporated herein by reference in its entirety.

BACKGROUND OF THE INVENTION

1. Field of the Invention

The present disclosure relates to a flow passage unit, a pressure detection device, and a method for manufacturing a flow passage unit.

2. Description of Related Art

Conventionally, a pressure detection device has been known which includes a flow passage unit, where a pressure transmitting surface is formed at a portion of a flow passage through which liquid is caused to flow, a pressure detection unit which detects a pressure transmitted to a pressure detection surface, and a mounting mechanism which mounts the flow passage unit and the pressure detection unit in a detachable manner (see Patent Literature 1, for example).

In the pressure detection device disclosed in Patent Literature 1, the flow passage unit is detachable with respect to the pressure detection unit so that in the case where a liquid being handled is blood, dialysate or the like, for example, the used flow passage unit can be replaced with a new flow passage unit.

[Patent Literature 1]
Japanese Unexamined Patent Application, Publication No. 2017-9467

BRIEF SUMMARY OF THE INVENTION

The flow passage unit disclosed in Patent Literature 1 introduces liquid flowing through the flow passage to a fluid chamber through an introduction flow passage branched from a flow passage extending in a straight line from an inflow port to an outflow port. The flow passage unit transmits the pressure of liquid from the pressure transmitting surface provided to the fluid chamber to the pressure detection surface of the pressure detection unit.

However, in the flow passage unit disclosed in Patent Literature 1, liquid is introduced into the fluid chamber by causing the introduction flow passage to be branched from the straight-line flow passage so that the flow passage unit has a space where the liquid stagnates without flowing (so-called dead volume). Further, in introducing liquid from the straight-line flow passage to the introduction flow passage, the flow direction of the liquid changes so that stagnation occurs in the flow of the liquid.

The flow passage unit of Patent Literature 1 has a space where liquid stagnates and hence, there is a possibility that problems are caused, such as a problem where bacteria are generated in the liquid stagnating in this space. For example, in the case where the liquid is blood, there is a possibility that a part of blood stagnating in the space coagulates, and flows out to the outside from the flow passage unit.

Further, in the flow passage unit of Patent Literature 1, stagnation occurs in the flow of liquid introduced from the straight-line flow passage to the introduction flow passage so that there is a possibility that a part of the liquid stagnates in the stagnation thus, causing problems, such as generation of bacteria or coagulation of the liquid.

Further, in the flow passage unit of Patent Literature 1, when liquid is caused to flow through the flow passage unit, it is necessary to charge the space where liquid stagnates. Accordingly, every time the flow passage unit is replaced, expensive liquid (culture solution, reagent or the like) is discarded, thus producing a waste.

The present disclosure has been made to solve the problems described above, and it is an object of the present disclosure to provide a flow passage unit, a pressure detection device, and a method for manufacturing a flow passage unit which can transmit the pressure of liquid flowing through the flow passage to the pressure detection unit with certainty without causing problems, such as generation of bacteria or coagulation of the liquid.

To solve the above-mentioned problems, the present disclosure adopts the following solutions.

A flow passage unit according to one aspect of the present disclosure is detachably mounted on a pressure detection unit which detects a pressure to be transmitted to a pressure detection part, the flow passage unit including: a flexible flow passage part including a flexible flow passage which introduces liquid, flowing in the flexible flow passage part from an inflow port, to an outflow port, and which is made of a flexible material; a body portion configured to form a pressure transmitting space which surrounds an outer peripheral surface of the flexible flow passage part; a pressure transmitting part mounted on the body portion and having a thin-film shape, one surface of the pressure transmitting part facing the pressure transmitting space, and the other surface of the pressure transmitting part being capable of coming into contact with the pressure detection part; and a pressure transmission medium filled in the pressure transmitting space, and being non-compressible, wherein the flexible flow passage is a flow passage which has a predetermined inner diameter, and which extends in a straight line along an axis.

According to the flow passage unit of one aspect of the present disclosure, the flexible flow passage, which introduces liquid, flowing in the flexible flow passage part from the inflow port, to the outflow port, is a flow passage which has a predetermined inner diameter, and which extends in a straight line. Accordingly, the flexible flow passage has no space where liquid stagnates without flowing so that no problem is caused, such as generation of bacteria or coagulation of the liquid.

Further, according to the flow passage unit of one aspect of the present disclosure, the pressure of the liquid flowing in the flexible flow passage part is transmitted to the inner peripheral surface of the flexible flow passage. The pressure transmitting space is formed to surround the outer peripheral surface of the flexible flow passage part, and the pressure transmission medium which is non-compressible is filled in this pressure transmitting space. The pressure transmission medium is non-compressible so that, even in the case where the flexible flow passage made of a flexible material is minutely deformed due to the pressure of the liquid, the volume of the pressure transmission medium does not vary. Accordingly, the pressure transmitting part deforms with the deformation of the flexible flow passage. In the state where the flow passage unit is mounted on the pressure detection unit, the pressure transmitting part comes into contact with the pressure detection part and hence, a pressure corresponding to the deformation of the pressure transmitting part is transmitted to the pressure detection part. As described above, according to the flow passage unit of one aspect of the present disclosure, the pressure of liquid flowing through the flow passage unit can be transmitted to the pressure detection unit with certainty.

It is preferable that the flow passage unit according to one aspect of the present disclosure include: a first flow passage part including a first flow passage which communicates with one of either the inflow port or the outflow port; a second flow passage part including a second flow passage which communicates with the other of either the inflow port or the outflow port; a first coupling part including a first coupling flow passage which couples the first flow passage part and one end of the flexible flow passage part, and which causes the first flow passage and the flexible flow passage to communicate with each other; and a second coupling part including a second coupling flow passage which couples the second flow passage part and the other end of the flexible flow passage part, and which causes the second flow passage and the flexible flow passage to communicate with each other, wherein each of the first flow passage, the second flow passage, the first coupling flow passage, and the second coupling flow passage is a flow passage which has the predetermined inner diameter, and which extends in a straight line along the axis.

According to the flow passage unit having this configuration, the first flow passage part and the one end of the flexible flow passage part are coupled by the first coupling part so that the first flow passage and the flexible flow passage are brought into a communicating state through the first coupling flow passage. Further, the second flow passage part and the other end of the flexible flow passage part are coupled by the second coupling part so that the second flow passage and the flexible flow passage are brought into a communicating state through the second coupling flow passage. Each of the first flow passage, the second flow passage, the first coupling flow passage, and the second coupling flow passage is a flow passage which has the predetermined inner diameter, and which extends in a straight line in the same manner as the flexible flow passage. Accordingly, there is no space where liquid stagnates without flowing within the range from the inflow port to the outflow port so that no problem is caused, such as generation of bacteria or coagulation of the liquid.

In the flow passage unit according to one aspect of the present disclosure, it is preferable that the first flow passage part and the body portion be integrally formed with each other, the second flow passage part and the second coupling part be integrally formed with each other, the body portion have an insertion hole extending along the first flow passage, and having a bottom portion on the first flow passage side, the first coupling part be mounted on the bottom portion of the insertion hole, and the second coupling part be mounted on an inlet portion of the insertion hole.

According to the flow passage unit having this configuration, the second flow passage part and the second coupling part are integrally formed with each other, whereas the first flow passage part and the first coupling part are not integrally formed with each other. Accordingly, by mounting one end of the flexible flow passage part on the first coupling part, and by mounting the other end of the flexible flow passage part on the second coupling part, the second flow passage part, the flexible flow passage part, the first coupling part, and the second coupling part can be formed into an assembly which is independent from the first flow passage part and the body portion. Further, by inserting the assembly into the insertion hole, which is formed in the body portion, to mount the first coupling part on the bottom portion of the insertion hole, the first flow passage part and the flexible flow passage part are brought into a state of being coupled by the first coupling part. By mounting the second coupling part on the inlet portion of the insertion hole, the insertion hole is closed so that the pressure transmitting space becomes a closed space. As described above, according to the flow passage unit having this configuration, it is possible to realize, with a relatively easy and simple assembling operation, the state where the first flow passage, the second flow passage, and the third flow passage are caused to communicate with each other, and the pressure transmitting space is formed on the outer peripheral surface of the flexible flow passage part.

In the flow passage unit according to one aspect of the present disclosure, it is preferable that the body portion have an opening portion for causing an external space and the pressure transmitting space to communicate with each other, and for filling the pressure transmission medium in the pressure transmitting space, and the opening portion be sealed with a sealing member in a state where the pressure transmission medium is filled in the pressure transmitting space.

According to the flow passage unit having this configuration, the pressure transmission medium can be filled in the pressure transmitting space through the opening portion formed in the body portion. Further, after the pressure transmission medium is filled in the pressure transmitting space, it is possible to cause the pressure transmitting space to become a closed space, which is separated from the external space, by sealing the opening portion with the sealing member.

In the flow passage unit according to one aspect of the present disclosure, it is preferable that the pressure transmission medium on which defoaming is performed be filled in the pressure transmitting space.

According to the flow passage unit having this configuration, the defoaming is performed on the pressure transmission medium to be filled in the pressure transmitting space. The pressure transmission medium does not include air bubbles so that when the flexible flow passage part is deformed due to the pressure of liquid flowing through the third flow passage, the displacement caused by the deformation is transmitted to the pressure detection part with certainty without being absorbed by the pressure transmission medium.

A pressure detection device according to one aspect of the present disclosure includes: the flow passage unit according to any one of the above; a pressure detection unit configured to detect a pressure to be transmitted from the pressure transmitting part to the pressure detection part; and a mounting mechanism configured to detachably mount the flow passage unit on the pressure detection unit.

According to the pressure detection device of one aspect of the present disclosure, it is possible to provide a pressure detection device including a flow passage unit which can transmit the pressure of liquid flowing through the flow passage to the pressure detection unit with certainty without causing problems, such as generation of bacteria or coagulation of the liquid.

A flow passage unit according to one aspect of the present disclosure is a method for manufacturing a flow passage unit detachably mounted on a pressure detection unit which detects a pressure to be transmitted to a pressure detection part, the flow passage unit including a first flow passage part including a first flow passage which communicates with one of either an inflow port through which liquid flows in the first flow passage part or an outflow port through which the liquid flows out from the first flow passage part, a second flow passage part including a second flow passage which communicates with the other of either the inflow port or the outflow port, a flexible flow passage part including a third flow passage made of a flexible material, a first coupling part including a first coupling flow passage which couples the first flow passage part and one end of the flexible flow passage part, and which causes the first flow passage and the third flow passage to communicate with each other, a second coupling part including a second coupling flow passage which couples the second flow passage part and the other end of the flexible flow passage part, and which causes the second flow passage and the third flow passage to communicate with each other, and a body portion forming a pressure transmitting space which surrounds an outer peripheral surface of the flexible flow passage part, the first flow passage part and the body portion being integrally formed with each other, the second flow passage part and the second coupling part are integrally formed with each other, and the body portion having an insertion hole which extends along the first flow passage, and which has a bottom portion on the first flow passage side, the method comprising the steps of: forming an assembly by mounting the first coupling part in one end of the flexible flow passage part and by mounting the second coupling part in the other end of the flexible flow passage part; inserting the assembly into the insertion hole, thus mounting the first coupling part on the bottom portion, and mounting the second coupling part on an inlet portion of the insertion hole;

mounting a pressure transmitting part having a thin-film shape on the body portion, one surface of the pressure transmitting part facing the pressure transmitting space, and the other surface of the pressure transmitting part being capable of coming into contact with the pressure detection part; filling a pressure transmission medium which is non-compressible in the pressure transmitting space through an opening portion formed in the body portion; performing defoaming on the pressure transmission medium by depressurizing the pressure transmitting space in which the pressure transmission medium is filled; and sealing the opening portion after the defoaming is performed on the pressure transmission medium, thus causing the pressure transmitting space to become a closed space.

According to the method for manufacturing a flow passage unit of one aspect of the present disclosure, the flexible flow passage part, the first coupling part, and the second coupling part are formed into an assembly and, thereafter, the assembly is inserted into the body portion so that it is possible to easily form the pressure transmitting space which surrounds the outer peripheral surface of the flexible flow passage part. Further, defoaming is performed on the pressure transmission medium by depressurizing the pressure transmitting space in which the pressure transmission medium is filled and hence, it is possible to transmit the pressure of liquid flowing through the third flow passage to the pressure detection part with certainty without losing the pressure.

In the method for manufacturing a flow passage unit according to one aspect of the present disclosure, it is preferable that the pressure transmission medium be made of a medium which gels by being set to a predetermined temperature or above in a mixed state, and the method include a step of heating the pressure transmission medium to the predetermined temperature or above after the defoaming is performed on the pressure transmission medium.

According to the method for manufacturing a flow passage unit having this configuration, the pressure transmission medium in a liquid state, which is not yet gelled, thus having low viscosity, can be easily filled in the pressure transmitting space through the opening portion formed in the body portion. Further, by heating the pressure transmission medium, filled in the pressure transmitting space, so as to cause the pressure transmission medium to gel, it is possible to suppress the flowing-out of the pressure transmission medium from the pressure transmitting space.

According to the present disclosure, it is possible to provide a flow passage unit, a pressure detection device, and a method for manufacturing a flow passage unit which can transmit the pressure of liquid flowing through the flow passage to the pressure detection unit with certainty without causing problems, such as generation of bacteria or coagulation of the liquid.

DETAILED DESCRIPTION OF THE INVENTION

Hereinafter, preferred embodiments of the present disclosure will be described in detail with reference to drawings. Note that the embodiments described hereinafter are preferred specific examples of the present disclosure, thus having various limitations which are preferable from a technical viewpoint. The scope of the present disclosure is not limited to these aspects unless otherwise limitation of the present disclosure is described in the following description. Further, in the respective drawings, similar constitutional elements are given the same reference symbols, and detailed description of such constitutional elements will be omitted when appropriate.

Hereinafter, a pressure detection device 100 according to a first embodiment of the present disclosure is described with reference to drawings.

Figure 1:
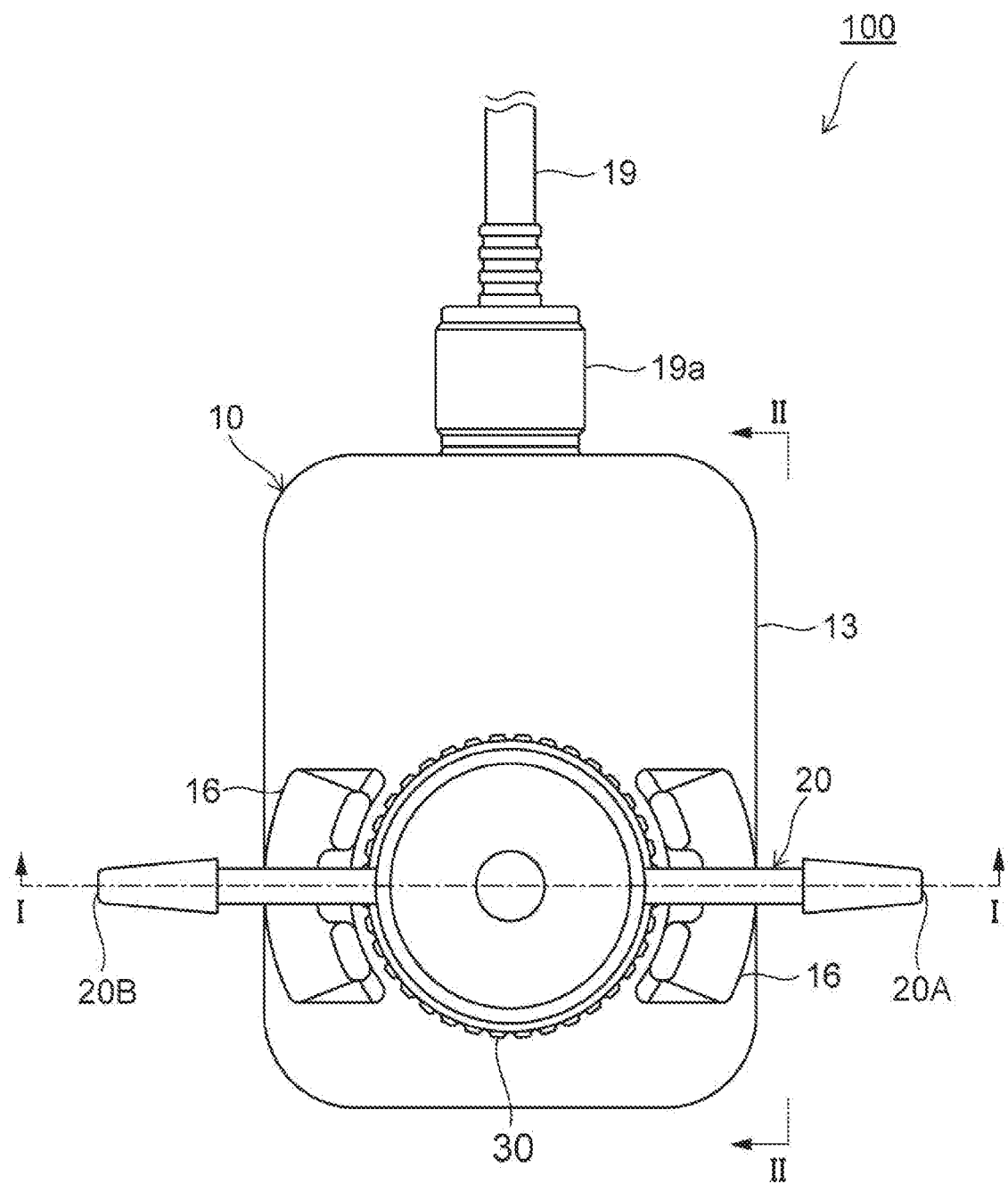
FIG. 1 is a front view showing one embodiment of a pressure detection device.
Figure 2:
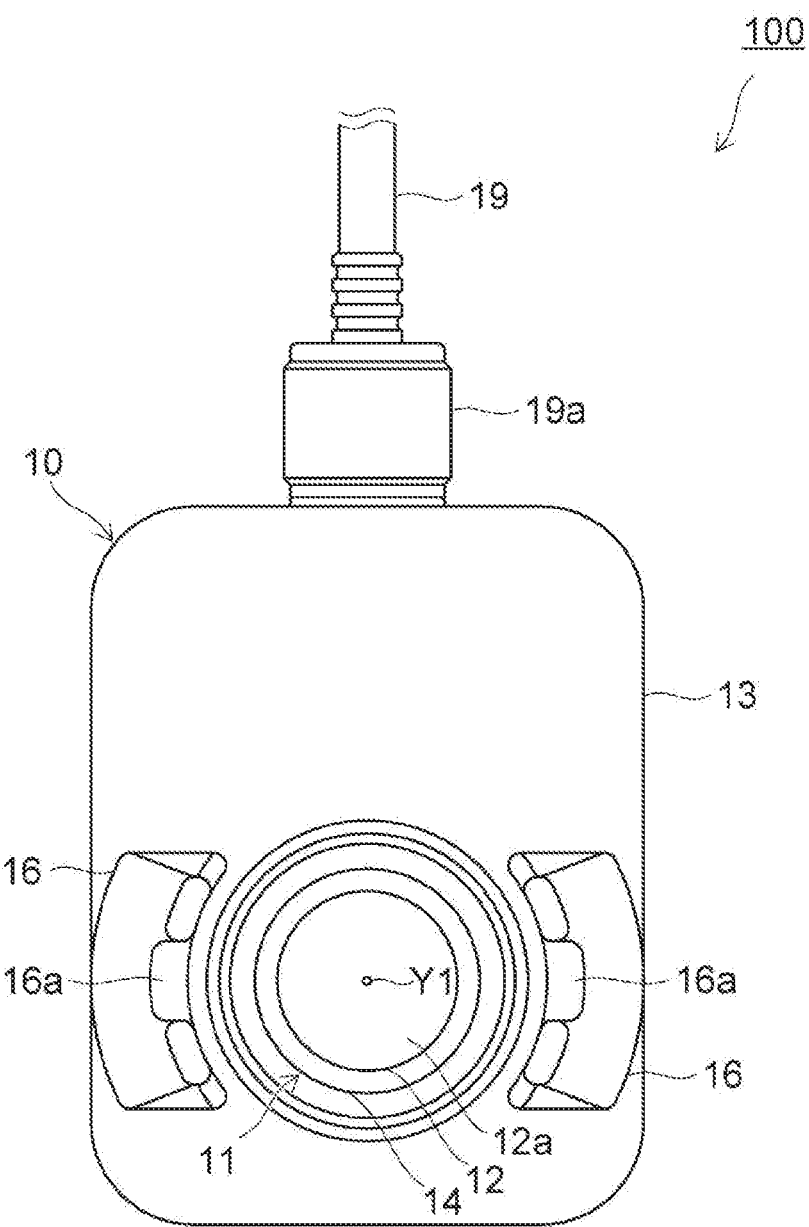
FIG. 2 is a view showing a state where a flow passage unit is removed from the pressure detection device shown in FIG. 1.

As shown in FIG. 1 and FIG. 2, the pressure detection device 100 of this embodiment includes: a pressure detection unit 10; a flow passage unit 20A; and a nut (mounting mechanism) 30. A flow passage is formed in the flow passage unit 20, and a fluid is made to flow through the flow passage along a straight-line flow direction from an inflow port 20A to an outflow port 20B. The nut (mounting mechanism) 30 allows the flow passage unit 20 to be detachably mounted on the pressure detection unit 10.

In the pressure detection device 100 of this embodiment, the flow passage unit 20 is mounted on the pressure detection unit 10 by the nut 30. The pressure detection device 100 is mounted on the installation surface (not shown in the drawing) in a state where the flow passage unit 20 is mounted on the pressure detection unit 10 by the nut 30 thus forming an integral body.

Figure 3:
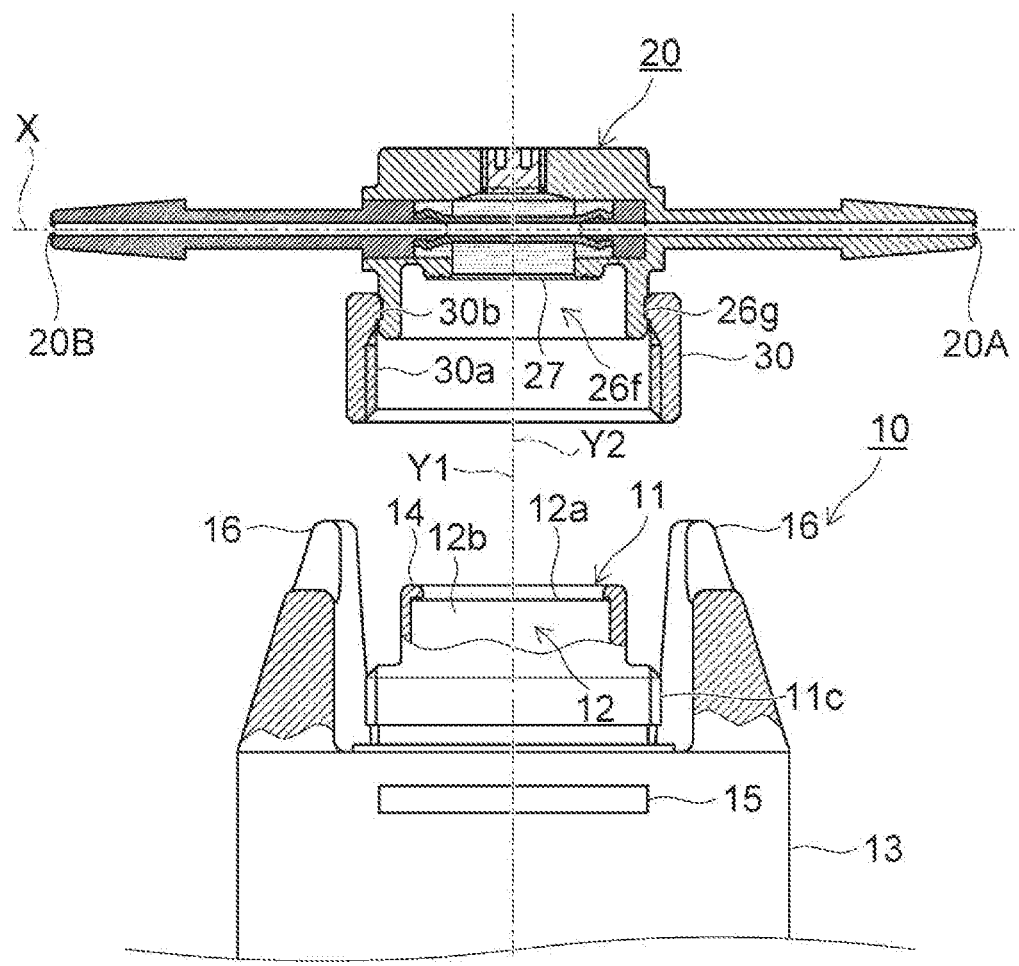
FIG. 3 is a view showing a state where the flow passage unit is removed from a pressure detection unit shown in FIG. 1 as viewed from an arrow I-I.
Figure 4:
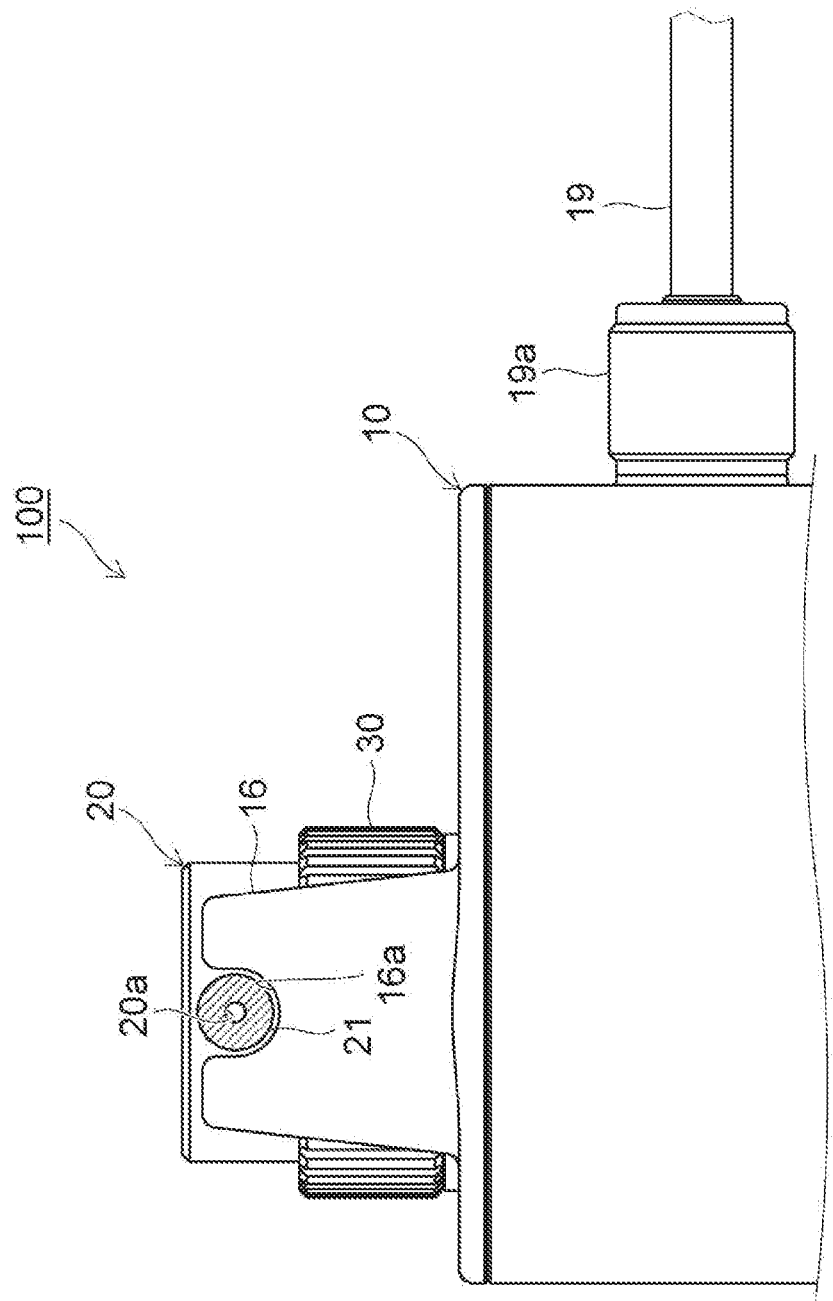
FIG. 4 is a cross-sectional view showing a state where the flow passage unit is mounted on the pressure detection unit shown in FIG. 1 as viewed from an arrow II-II.

As shown in FIG. 3 and FIG. 4, an inflow side pipe (not shown in the drawing), through which a fluid is made to flow in the inflow port 20A, is mounted on the inflow port 20A of the flow passage unit 20. An outflow side pipe (not shown in the drawing), through which the fluid flowing out from the outflow port 20B flows, is mounted on the outflow port 20B of the flow passage unit 20. A pressure of a fluid flowing through the flow passage from the inflow port 20A to the outflow port 20B is detected by the pressure detection unit 10. In this embodiment, "liquid" refers to a material which is utilized for applications in the medical field or life sciences, such as blood, cell culture solution, liquid reagent, or dialysate, for example. Further, the liquid may be a chemical, a cleaning solution or the like which is used for manufacturing a semiconductor.

As shown in FIG. 3, the pressure detection unit 10 includes a body portion 13 mounted on the installation surface (not shown in the drawings). As shown in FIG. 2, a cable 19 is mounted on the body portion 13 of the pressure detection unit 10 by way of a cable mounting nut 19a. The cable 19 electrically connects a pressure sensor 12, which is disposed in the body portion 13, and a control device (not shown in the drawing) disposed outside the body portion 13 with each other.

Next, the pressure detection unit 10 is described in detail with reference to FIG. 1 to FIG. 3. The pressure detection unit 10 shown in FIG. 1 to FIG. 3 is a device which detects a pressure transmitted to a diaphragm 12a.

As shown in FIG. 1 to FIG. 3, the pressure detection unit 10 includes: the body portion 13; the pressure sensor 12 disposed in the body portion 13; a sensor holding portion 14 which holds the pressure sensor 12 onto the body portion 13; a sensor board (setting part) 15 for transmitting power and an electric signal between the pressure sensor 12 and the cable 19; a pair of guide members (guide parts) 16 which guides the flow passage of the flow passage unit 20 to a predetermined mounting position; and a zero-point adjustment switch (not shown in the drawings) for performing a zero-point adjustment of the pressure sensor 12.

As shown in FIG. 3, the pressure sensor 12 includes: the diaphragm (pressure detection surface) 12a formed into a thin film shape using a material having corrosion resistance (for example, sapphire); a strain resistance (not shown in the drawing) adhered to the diaphragm 12a; and a base portion 12b which holds the diaphragm 12a.

The pressure sensor 12 is a strain type sensor. The strain type sensor outputs a pressure signal which corresponds to a change in strain resistance, which deforms together with the diaphragm 12a corresponding to a pressure transmitted to the strain resistance. A through hole (not shown in the drawing), which communicates with the diaphragm 12a, is formed in the base portion 12b so that one surface of the diaphragm 12a is maintained at an atmospheric pressure. Accordingly, the pressure sensor 12 is a sensor which detects a gauge pressure using an atmospheric pressure as a reference.

The sensor holding portion 14 is a member formed into a cylindrical shape about an axis (first axis) Y1. An inner diameter of an upper end of the sensor holding portion 14 is smaller than an outer diameter of the pressure sensor 12 so that the sensor holding portion 14 can hold the pressure sensor 12 while preventing the pressure sensor 12 from removing in the upward direction.

As shown in FIG. 3, the pressure sensor 12 and the sensor holding portion 14 of the pressure detection unit 10 project upward from the body portion 13 along the axis Y1, thus forming a projecting portion 11 where the diaphragm 12a is disposed at the top portion of the projecting portion 11.

The sensor board 15 includes: an amplifier circuit (not shown in the drawing) which amplifies a pressure signal outputted from the pressure sensor 12; an interface circuit which transmits the pressure signal, amplified by the amplifier circuit, to a pressure signal line (not shown in the drawing) of the cable 19; a power supply circuit (not shown in the drawing) which transmits a power supply voltage supplied from the outside through the cable 19 to the pressure sensor 12; a zero-point adjustment circuit (not shown in the drawing) which performs a zero-point adjustment when the zero-point adjustment switch is pressed and the like.

The zero-point adjustment circuit is a circuit which performs an adjustment such that, when the zero-point adjustment switch is pressed, a pressure signal outputted from the pressure sensor 12 at that point of time is set as a reference value (for example, zero).

FIG. 2 is a view showing a state where the flow passage unit 20 is removed from the pressure detection device 100 shown in FIG. 1. As shown in FIG. 2, in a state where the flow passage unit 20 is not mounted on the pressure detection unit 10, the diaphragm 12a of the pressure sensor 12 is exposed to the outside.

The guide members 16 are members each of which has a groove portion 16a for guiding the flow passage to a predetermined mounting position in mounting the flow passage unit 20 on the pressure detection unit 10. The pairs of guide members 16 are provided at positions which are symmetrical with respect to the axis Y1. The pair of guide members 16 respectively guide a portion of the flow passage on the inflow port 20A side and a portion of the flow passage on the outflow port 20B side to predetermined mounting positions. The predetermined mounting position means a position which causes a state where, as shown in FIG. 4, an outer peripheral surface of the flow passage (a first flow passage 21) is surrounded by the groove portion 16a of the guide member 16.

Next, the flow passage unit 20 will be described in detail with reference to FIG. 5 to FIG. 9.

Figure 5:
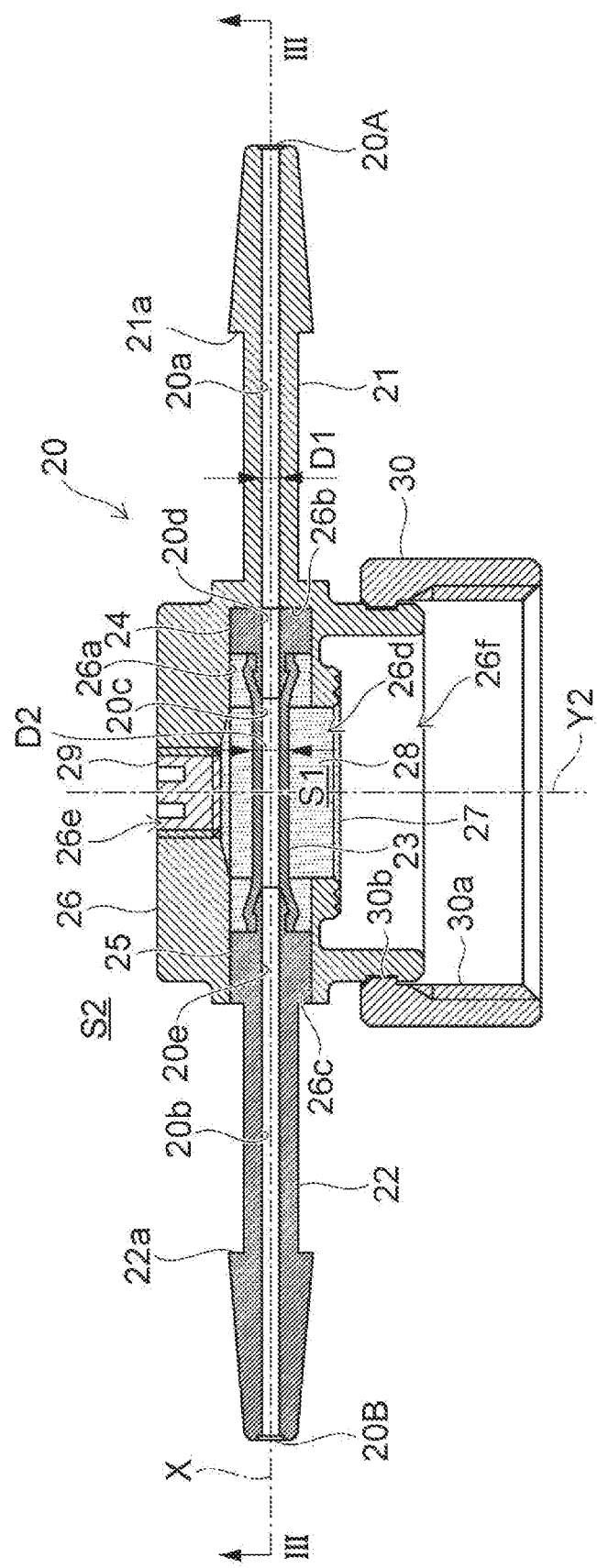
FIG. 5 is a cross-sectional view of the flow passage unit shown in FIG. 1 as viewed from an arrow I-I.
Figure 6:
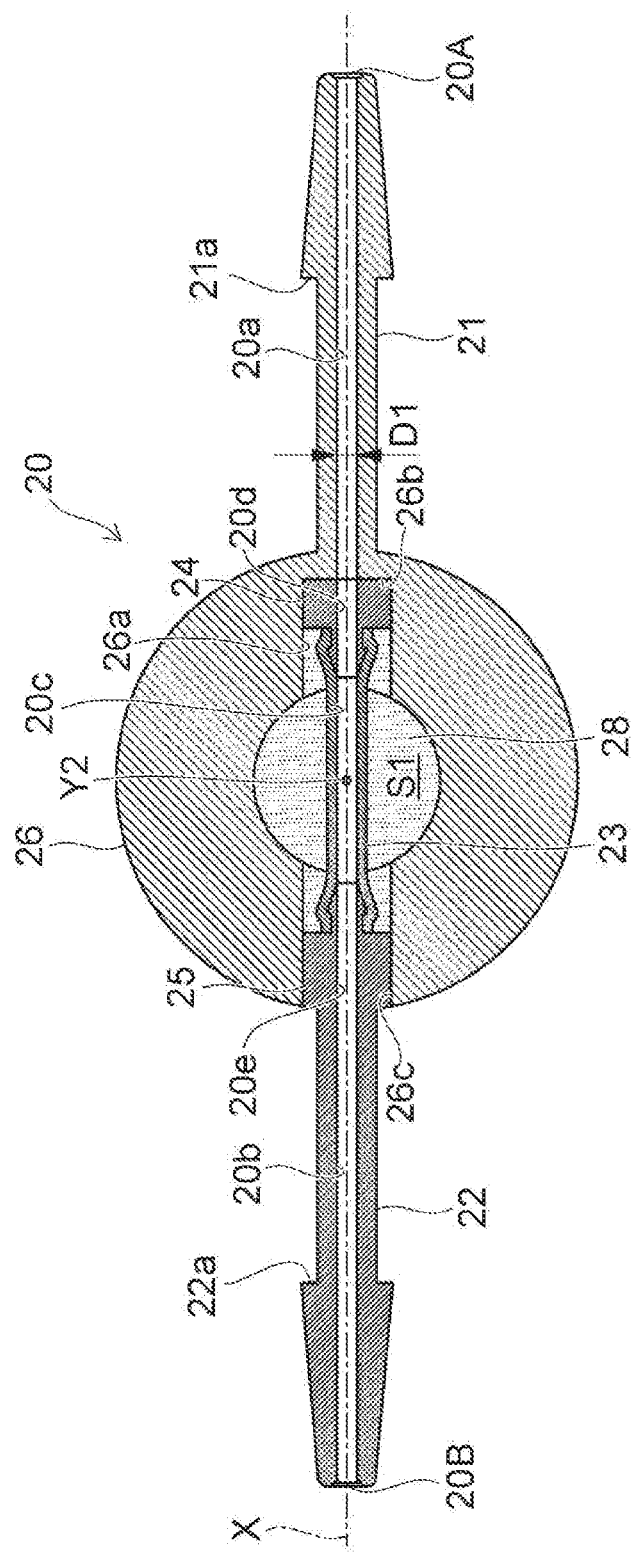
FIG. 6 is a cross-sectional view of the flow passage unit shown in FIG. 5 as viewed from an arrow III-III.

As shown in FIG. 5 and FIG. 6, the flow passage unit 20 includes a first flow passage part 21, a second flow passage part 22, a flexible flow passage part 23, a first coupling part 24, a second coupling part 25, a body portion 26, a diaphragm (pressure transmitting part) 27, a pressure transmission medium 28 filled in a pressure transmitting space S1, and a lid portion (sealing member) 29.

The first flow passage part 21 includes a first flow passage 20a which communicates with an inflow port 20A through which liquid flows in the first flow passage part 21. The second flow passage part 22 includes a second flow passage 20b which communicates with an outflow port 20B through which liquid flows out from the first flow passage part 21. The flexible flow passage part 23 includes a third flow passage (flexible flow passage) 20c. The first coupling part 24 includes a first coupling flow passage 20d which causes the first flow passage 20a and the third flow passage 20c to communicate with each other. The second coupling part 25 includes a second coupling flow passage 20e which causes the second flow passage 20b and the third flow passage 20c to communicate with each other.

Note that although the first flow passage 20a communicates with the inflow port 20A and the second flow passage 20b communicates with the outflow port 20B in the above-mentioned description, other aspects may be adopted. For example, in the case where the outflow port 20B is disposed in the first flow passage part 21 and the inflow port 20A is disposed in the second flow passage part 22, the first flow passage 20a communicates with the outflow port 20B and the second flow passage 20b communicates with the inflow port 20A.

Each of the first flow passage 20a, the second flow passage 20b, the third flow passage 20c, the first coupling flow passage 20d, and the second coupling flow passage 20e is a flow passage having a circular shape as viewed in a cross-sectional view, having an inner diameter D1 (0.3 mm or more and 10 mm or less, for example), and extending in a straight line along an axis X. These flow passages form, as a whole, a flow passage which extends from the inflow port 20A to the outflow port 20B in a straight line with the same inner diameter. The flow passage included by the flow passage unit 20 has no variation in inner diameter within the entire region ranging from the inflow port 20A to the outflow port 20B.

The first flow passage part 21, the second flow passage part 22, the first coupling part 24, and the second coupling part 25 are made of a thermoplastic resin having relatively high rigidity, such as polycarbonate (PC) or polyvinyl chloride (PVC), for example. Accordingly, there is no possibility that the inner diameters D1 of the first flow passage 20a, the second flow passage 20b, the first coupling flow passage 20d, and the second coupling flow passage 20e varies due to a pressure of liquid (0 or more and 500 KPa(G) or less, for example) which flows through the passages.

In contrast, the flexible flow passage part 23 is made of a non-compressible flexible material, such as silicone rubber, vinyl chloride, butyl rubber, isoprene rubber, or natural rubber. It is desirable that the inner diameter D1 of the flexible material is set to 0.3 mm or more and 10 mm or less, and the thickness of the flexible material is set to 0.05 mm or more and 1.00 mm or less, for example. In this case, an outer diameter D2 is 0.4 mm or more and 12.0 mm or less. It is desirable that rigidity of the flexible material is 50 (A50/S) or less in terms of type-A durometer hardness (conforming to ISO7619), for example.

The first flow passage part 21 is a member which is formed into a cylindrical shape extending along the axis X, and which includes a stepped portion 21a for locking a pipe (not shown in the drawing) to be mounted on the inflow port 20A side. The first flow passage part 21 is integrally formed with the body portion 26 using the same material as the body portion 26.

The second flow passage part 22 is a member which is formed into a cylindrical shape extending along the axis X, and which includes a stepped portion 22a for locking a pipe (not shown in the drawing) to be mounted on the outflow port 20B side. The second flow passage part 22 is integrally formed with the second coupling part 25 using the same material as the second coupling part 25.

The flexible flow passage part 23 has a cylindrical shape extending along the axis X, and one end of the flexible flow passage part 23 is mounted on a stepped portion of the first coupling part 24, and the other end of the flexible flow passage part 23 is mounted on the stepped portion of the second coupling part 25. The flexible flow passage part 23 is made of a flexible material, thus being minutely deformed due to the pressure of liquid flowing through the third flow passage 20c. The flexible flow passage part 23 is deformed such that the inner diameter of the flexible flow passage part 23 increases as the pressure of the liquid flowing through the third flow passage 20c increases. The deformation of the flexible flow passage part 23 is transmitted to the diaphragm 27 through the pressure transmission medium 28.

The first coupling part 24 is a member which couples the first flow passage part 21 and the end portion of the flexible flow passage part 23 on the inflow port 20A side. The portion of the first coupling part 24 on the inflow port 20A side is formed into a cylindrical shape extending along the axis X, and has the outer diameter thereof slightly smaller than the inner diameter of an insertion hole 26a of the body portion 26. The portion of the first coupling part 24 on the outflow port 20B side is formed into a shape including the stepped portion for locking the end portion of the flexible flow passage part 23 on the inflow port 20A side. The first coupling part 24 is a structural body independent from the first flow passage part 21 and the body portion 26, and is mounted on a bottom portion 26b of the insertion hole 26a of the body portion 26 by an adhesive agent.

The second coupling part 25 is a member which couples the second flow passage part 22 and the end portion of the flexible flow passage part 23 on the outflow port 20B side. The portion of the second coupling part 25 on the outflow port 20B side is formed into a cylindrical shape extending along the axis X, and has the outer diameter thereof slightly smaller than the inner diameter of the insertion hole 26a of the body portion 26. The portion of the second coupling part 25 on the inflow port 20A side is formed into a shape including the stepped portion for locking the end portion of the flexible flow passage part 23 on the outflow port 20B side. The second coupling part 25 is integrally formed with the second flow passage part 22 using the same material as the second flow passage part 22. The second coupling part 25 is a structural body independent from the body portion 26, and is mounted on an inlet portion 26c of the insertion hole 26a of the body portion 26 by an adhesive agent.

The body portion 26 is a member which accommodates the first coupling part 24, the second coupling part 25, and the flexible flow passage part 23 therein. The insertion hole 26a is formed in the body portion 26, wherein the insertion hole 26a extends along the axis X, which is the same axis as the first flow passage 20a, and includes the bottom portion 26b on the first flow passage 20a side. A space extending in a cylindrical shape along an axis Y2, which is orthogonal to the plane of the diaphragm 27, is formed in the body portion 26. A space formed by combining the insertion hole 26a and the space extending in a cylindrical shape forms the pressure transmitting space S1 which surrounds the outer peripheral surface of the flexible flow passage part 23.

An opening portion 26e for mounting the lid portion 29 is formed above the pressure transmitting space S1 of the body portion 26. The opening portion 26e is a through hole which causes an external space S2 and the pressure transmitting space S1 to communicate with each other. The opening portion 26e may be used for filling the pressure transmission medium 28 in the pressure transmitting space S1.

As shown in FIG. 5, a recessed portion 26f is formed at the end portion of the body portion 26 on the nut 30 side. The diaphragm 27 is mounted on the bottom portion of the recessed portion 26f so that it is possible to suppress the problem of the diaphragm 27 coming into contact with another member, thus being damaged.

The diaphragm 27 is a member formed into a thin-film shape using a material having corrosion resistance (a silicone resin or a polycarbonate resin, for example). As shown in FIG. 5, the diaphragm 27 is mounted on the body portion 26 by an ultraviolet-curable adhesive agent or the like such that the diaphragm 27 closes an opening portion 26d formed in the body portion 26. The opening portion 26d is open toward the nut 30 side along the axis Y2. One surface of the diaphragm 27 faces the pressure transmitting space S1, and the other surface of the diaphragm 27 faces the nut 30 side along the axis Y2. The other surface comes into contact with the diaphragm 12a of the pressure sensor 12 in a state where the flow passage unit 20 is mounted on the pressure detection unit 10.

Figure 9:
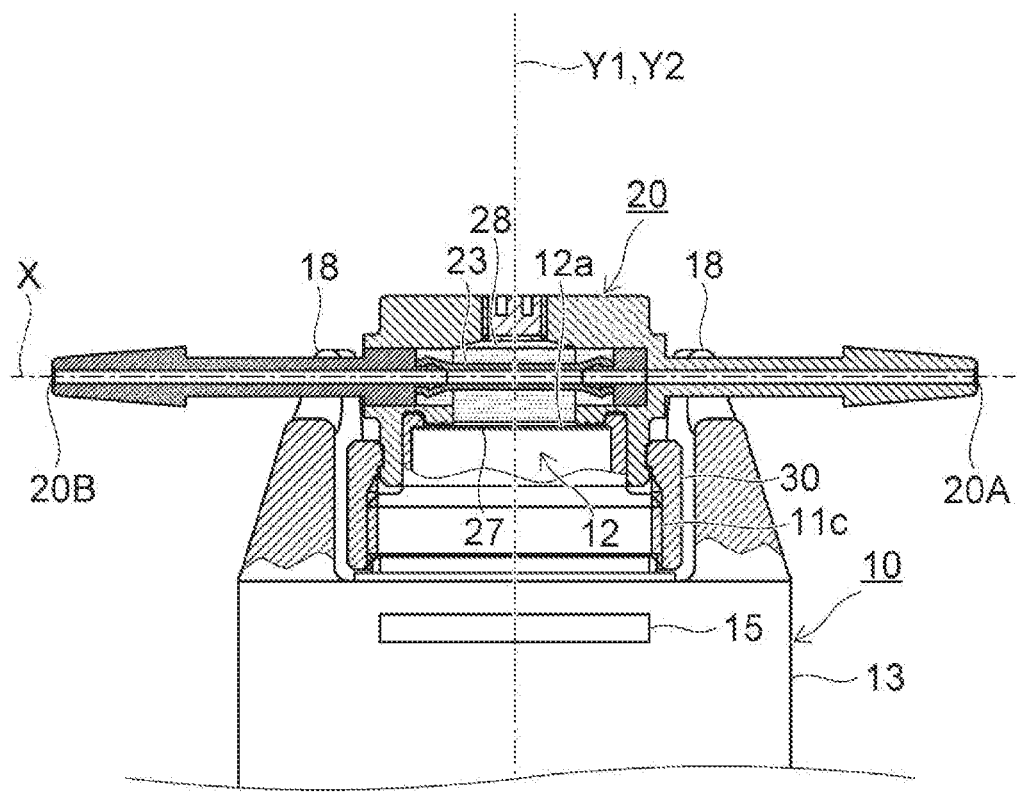
FIG. 9 is a view showing a state where the flow passage unit is mounted on the pressure detection unit shown in FIG. 1 as viewed from the arrow I-I.

In a state shown in FIG. 9 where the flow passage unit 20 is mounted on the pressure detection unit 10, the diaphragm 27 of the flow passage unit 20 is in contact with the diaphragm 12a of the pressure detection unit 10. Accordingly, the diaphragm 27 forms a pressure transmitting surface for transmitting a pressure of a fluid which flows through the flexible flow passage part 23 to the diaphragm 12a via the pressure transmission medium 28.

The pressure transmission medium 28 is a medium in a gel state obtained such that plural kinds of silicone liquids are mixed in a predetermined ratio (two kinds of silicone liquids being mixed in a ratio of 1:1, for example), and the mixture is maintained at a predetermined temperature (70° C., for example) or above for a predetermined time period (30 minutes, for example), thus increasing viscosity. The rigidity of the pressure transmission medium 28 is desirably set such that penetration is set to 50 or more, for example. The pressure transmission medium 28 is filled, without any gap, in the pressure transmitting space S1, which is sealed with the lid portion 29, thus becoming a closed space.

Note that another medium may be used as the pressure transmission medium 28. For example, it may be also possible to use two kinds of silicone liquids which increase viscosity when mixed at room temperature (20° C. to 30° C., for example). Further, for example, it is possible to use a single kind of silicone liquid which increases viscosity when maintained at a predetermined temperature (70° C., for example) or above for a predetermined time period (30 minutes, for example). Further, for example, it is possible to use a mixed liquid of water and macromolecule which increases viscosity when a crosslinking agent is added. Further, for example, it is possible to use a mixed liquid of water and macromolecule (hydrogel) which increases viscosity when freezing and thawing are repeated. The main component of the mixed liquid is water so that it is preferable to use water-soluble polymer as macromolecule. Further, another non-compressible medium, such as pure water or saline may be used, for example.

The lid portion 29 is a member formed into a cylindrical shape along the axis Y2, and is made of an epoxy resin or an acrylic resin, for example. A male thread is formed on the outer peripheral surface of the lid portion 29 in the circumferential direction about the axis Y2. When the male thread formed on the outer peripheral surface of the lid portion 29 is engaged with a female thread formed on the inner peripheral surface of the opening portion 26e of the body portion 26, the lid portion 29 is fixed to the body portion 26. The opening portion 26e of the body portion 26 is sealed with the lid portion 29 in the state where the pressure transmission medium 28 is filled in the pressure transmitting space S1.

Figure 7:
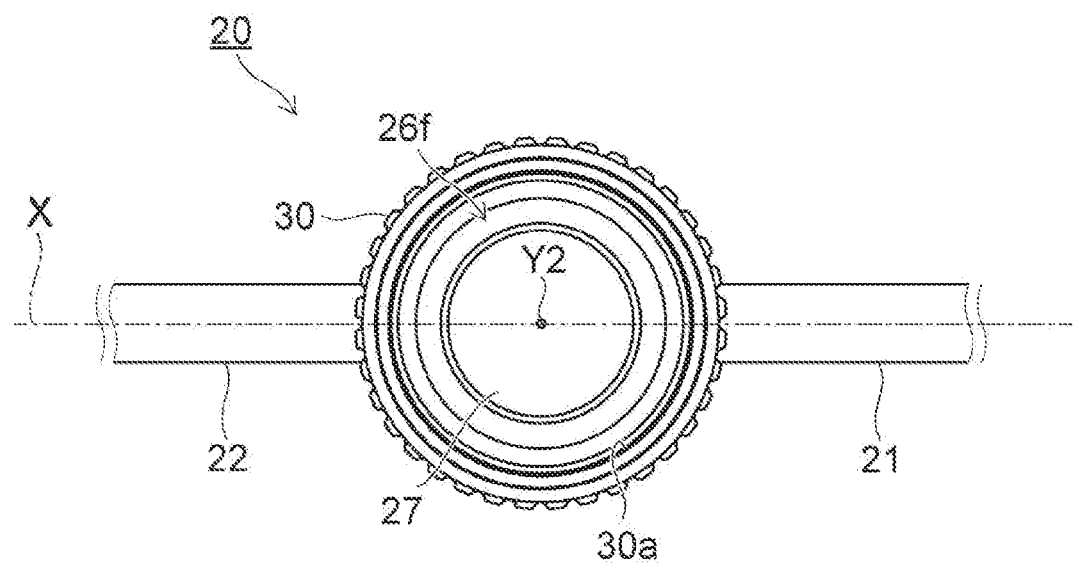
FIG. 7 is a back view of the flow passage unit shown in FIG. 1.
Figure 8:
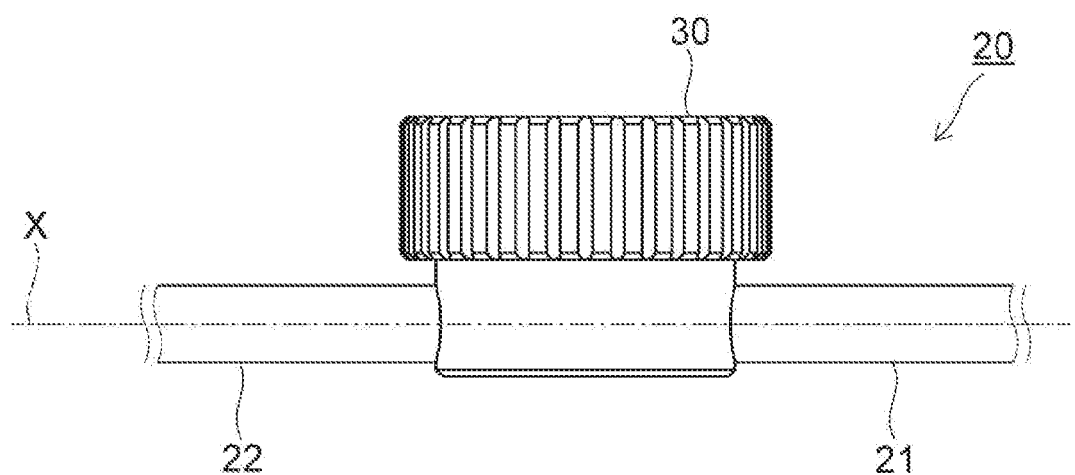
FIG. 8 is a bottom view of the flow passage unit shown in FIG. 1.

FIG. 7 is a back view of the flow passage unit 20 shown in FIG. 1. FIG. 8 is a bottom view of the flow passage unit 20 shown in FIG. 1. As shown in FIG. 7, in a state where the flow passage unit 20 is not mounted on the pressure detection unit 10, the diaphragm 27 is exposed to the outside. However, the diaphragm 27 is disposed on the bottom portion of the recessed portion 26f of the body portion 26 and hence, there is a low risk of an operator inadvertently coming into contact with the diaphragm 27.

As shown in FIG. 3, an endless annular groove portion 26g is formed on an outer peripheral surface of the recessed portion 26f of the flow passage unit 20. On the other hand, an endless annular protrusion portion 30b is formed on an inner peripheral surface of the nut 30, and the annular protrusion portion 30b extends about the axis Y2.

The nut 30 is made of an elastically deformable material (for example, resin material). When the nut 30 is pressed toward the annular groove portion 26g formed on the outer peripheral surface of the recessed portion 26f, the annular protrusion portion 30b is engaged with the annular groove portion 26g.

In a state shown in FIG. 3 where the annular protrusion portion 30b is engaged with the annular groove portion 26g, an extremely small gap is formed between an outer peripheral surface of the annular protrusion portion 30b and an inner peripheral surface of the annular groove portion 26g. Accordingly, in a state where the nut 30 is mounted on the pressure detection unit 10, the nut 30 is rotatable with respect to the projecting portion 11 about the axis Y1. With such a configuration, an operator can rotate the nut 30 about the axis Y1 in a state where the pressure detection unit 10 is fixed to the installation surface.

As shown in FIG. 3, the nut 30 is a circular annular member where a female thread 30a extending about the axis Y2 is formed on an inner peripheral surface of the nut 30. The nut 30 is a mechanism which allows the flow passage unit 20 to be detachably mounted on the pressure detection unit 10 by causing the female thread 30a to be fastened to a male thread 11c formed on the outer peripheral surface of the projecting portion 11 of the flow passage unit 20, or by releasing the fastening between the female thread 30a and the male thread 11c.

Figure 10:
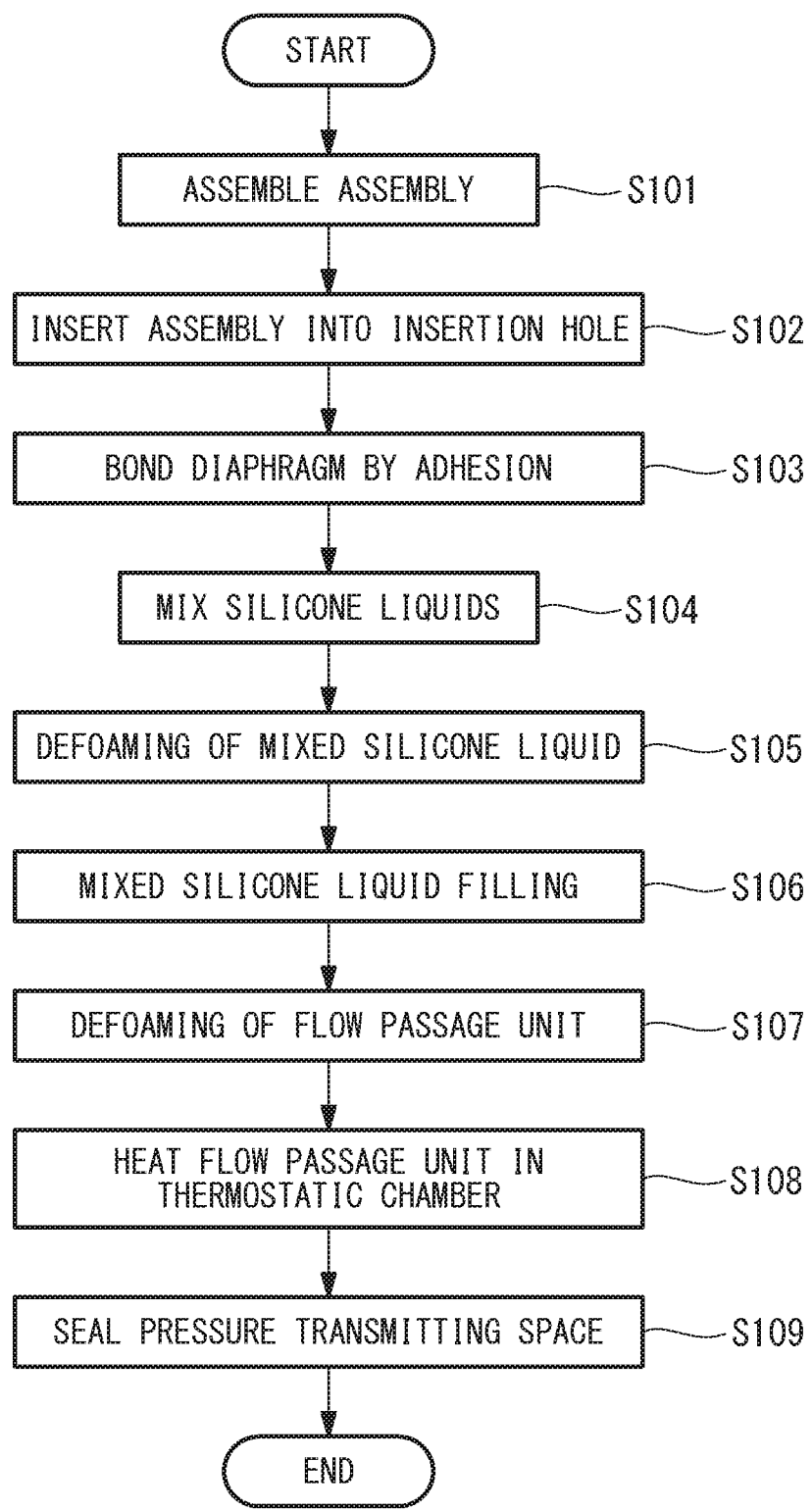
FIG. 10 is a flowchart showing a method for manufacturing a flow passage unit.
Figure 11:
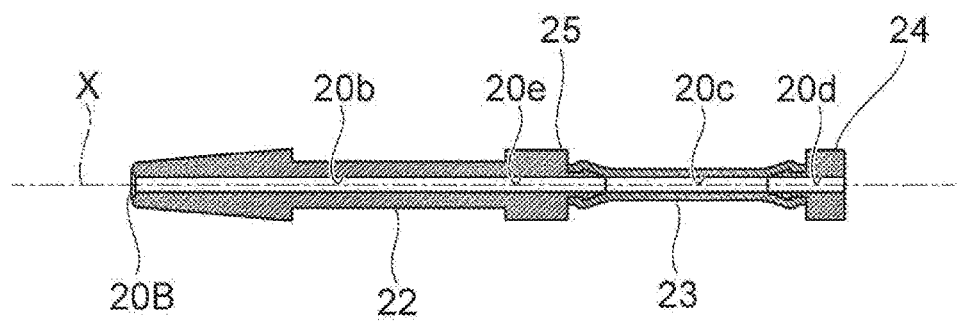
FIG. 11 is a view showing an assembly obtained by assembling a flexible flow passage part, a first coupling part, and a second coupling part.
Figure 12:
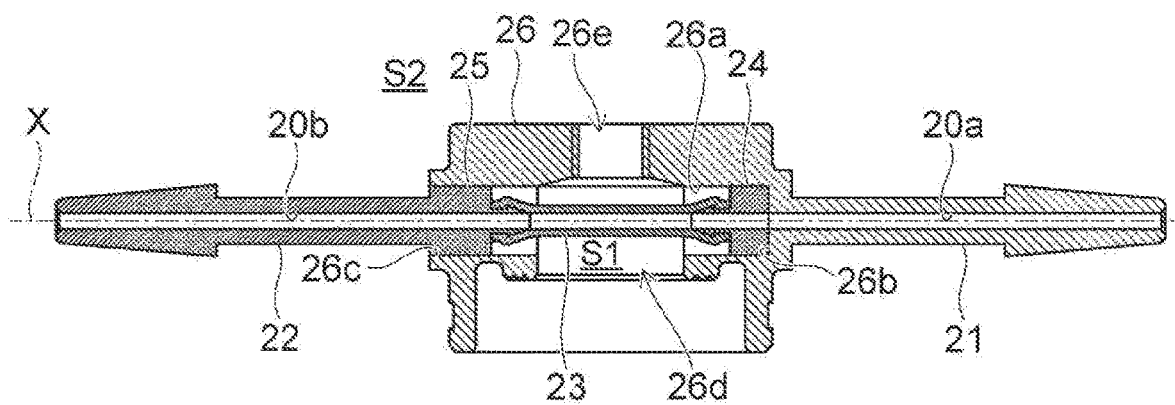
FIG. 12 is a view showing a state where the assembly is inserted into an insertion hole of a body portion.
Figure 13:
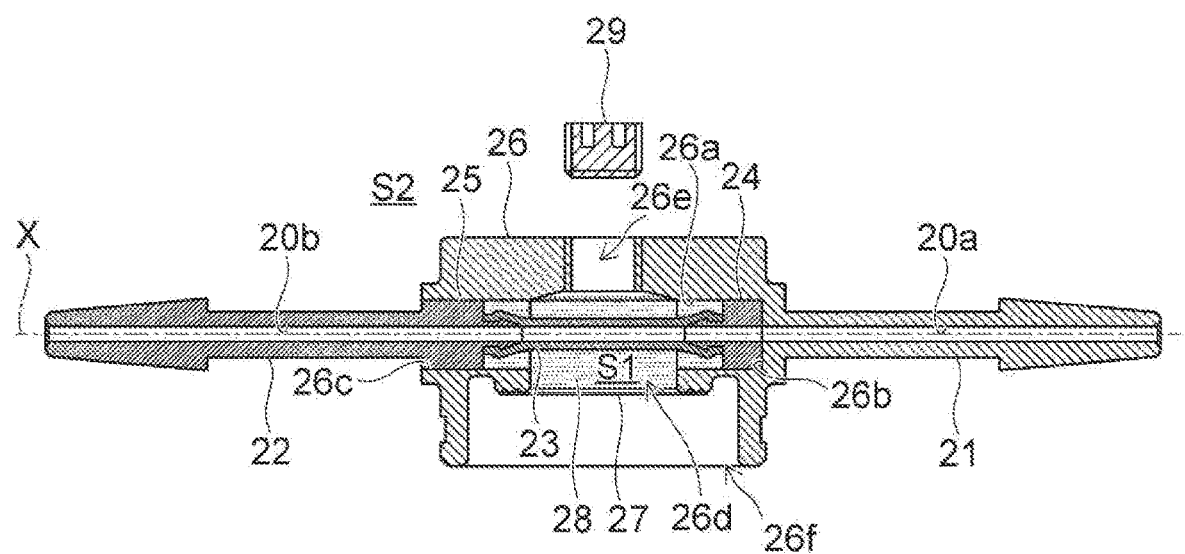
FIG. 13 is a view showing a state where a pressure transmission medium is filled in a pressure transmitting space.

Next, a method for manufacturing the flow passage unit 20 of this embodiment will be described with reference to FIG. 10 to FIG. 13. FIG. 10 is a flowchart showing the method for manufacturing the flow passage unit 20 of this embodiment. FIG. 11 is a view showing an assembly obtained by assembling the flexible flow passage part 23, the first coupling part 24, and the second coupling part 25. FIG. 12 is a view showing a state where the assembly is inserted into the insertion hole 26a of the body portion 26. FIG. 13 is a view showing a state where the pressure transmission medium 28 is filled in the pressure transmitting space S1.

In step S101, an operator who manufactures the flow passage unit 20 mounts the stepped portion of the first coupling part 24 in one end of the flexible flow passage part 23, and mounts the stepped portion of the second coupling part 25 on the other end of the flexible flow passage part 23. As shown in FIG. 11, the flexible flow passage part 23, the first coupling part 24, and the second coupling part 25 are formed into an assembly obtained by coupling these parts.

In step S102, the operator inserts the assembly, which is assembled in step S101, into the insertion hole 26*a* of the body portion 26. Before the insertion of the assembly into the insertion hole 26*a*, the operator applies by coating an adhesive agent to the inner peripheral surface of the insertion hole 26*a*. The regions to which the adhesive agent is applied by coating are a region in the vicinity of the bottom portion 26*b* of the insertion hole 26*a* which comes into contact with the first coupling part 24 and a region in the vicinity of the inlet portion 26*c* of the insertion hole 26*a* which comes into contact with the second coupling part 25.

As shown in FIG. 12, the adhesive agent is applied by coating to the bottom portion 26*b* so that when the assembly is inserted into the insertion hole 26*a*, the first coupling part 24 is brought into a state of being mounted on the bottom portion 26*b*. Further, the adhesive agent is applied by coating to the inlet portion 26*c* so that when the assembly is inserted into the insertion hole 26*a*, the second coupling part 25 is brought into a state of being mounted on the inlet portion 26*c*. The state shown in FIG. 12 is a state where the pressure transmitting space S1 communicates with the external space S2 through the opening portion 26*e*.

In step S103, the operator mounts the thin-film shaped diaphragm 27, which can come into contact with the diaphragm 12*a* of the pressure detection unit 10, on the bottom portion of the recessed portion 26*f* of the body portion 26 by an ultraviolet-curable adhesive agent or the like. Mounting the diaphragm 27 brings the opening portion 26*d* of the body portion 26 into a closed state.

In step S104, the operator mixes plural kinds of silicone liquids in a predetermined ratio (two kinds of silicone liquids being mixed in a ratio of 1:1, for example). This operation is performed in an environment at a temperature (room temperature of 20° C. to 30° C., for example) sufficiently lower than a predetermined temperature (70° C., for example) at which the viscosity of the mixed silicone liquid is elevated. The silicone liquids are mixed in a different container (syringe or the like) from the flow passage unit 20.

In step S105, the operator accommodates the container storing the mixed silicone liquid into a vacuum chamber to perform defoaming on the mixed silicone liquid. The defoaming refers to a process where the pressure of liquid is lowered to −90 kPa(G) or less in a stepwise manner, thus removing air bubbles included in the liquid. The mixed silicone liquid is a liquid used as the pressure transmission medium 28. The reason for performing the defoaming is that if air bubbles are included in the pressure transmission medium 28, a part of the pressure transmitted from the flexible flow passage part 23 is absorbed by the air bubbles.

In step S106, the operator performs mixed silicone liquid filling. The operator fills the mixed silicone liquid, which is stored in the container (not shown in the drawing) and on which the defoaming is performed, into the pressure transmitting space S1 through the opening portion 26*e* formed in the body portion 26. In the case where the container is a syringe, the operator pushes a plunger with the distal end of the syringe inserted into the opening portion 26*e*, thus injecting the mixed silicone liquid into the pressure transmitting space S1. After the filling of the pressure transmission medium 28 into the pressure transmitting space S1 is completed, the state shown in FIG. 13 is brought about.

In step S107, the operator accommodates the flow passage unit 20, in which the pressure transmission medium 28 is filled, into the vacuum chamber to perform the defoaming of the flow passage unit 20. The defoaming of the flow passage unit 20 is a process where the external space S2, where the flow passage unit 20 is present, is depressurized to −90 kPa(G) or less in a stepwise manner, thus removing air present in the pressure transmitting space S1. By performing the defoaming of the flow passage unit 20, air present in a gap between the inner peripheral surface of the body portion 26 forming the pressure transmitting space S1 and the pressure transmission medium 28 filled in the pressure transmitting space S1 is released to the external space S2.

In step S108, the operator takes out the flow passage unit 20, on which the defoaming is performed, from the vacuum chamber, and heats the flow passage unit 20 in a thermostatic chamber (not shown in the drawing) which is maintained at a predetermined temperature or above in an atmospheric pressure environment. The pressure transmission medium 28 filled in the flow passage unit 20 is made of a plurality of mediums which increase viscosity and gel when the mediums are set to a predetermined temperature (70° C., for example) or above in a mixed state. The flow passage unit 20 is maintained at a predetermined temperature or above for at least a predetermined time period (30 minutes, for example) in the thermostatic chamber. The mixed silicone liquid increases viscosity, thus being formed into a medium in a gel state.

In step S109, after the defoaming is performed on the pressure transmission medium 28, the operator seals the opening portion 26*e* with the lid portion 29, thus causing the pressure transmitting space S1 to become a closed space. With the above steps, the flow passage unit 20 is manufactured where the pressure transmission medium 28 is filled in the pressure transmitting space S1, which is a closed space.

The manufacturing method described above is a manufacturing method which is executed in the case where a medium which gels when heated to a predetermined temperature or above is used as the pressure transmission medium 28. In the case where a mixed liquid of water and macromolecule which increases viscosity with the addition of a crosslinking agent is used as the pressure transmission medium 28, the manufacturing method shown in FIG. 10 is modified in the following points. Firstly, the step in step S104 becomes a step of preparing a mixed liquid by mixing water, macromolecule, and a crosslinking agent. Secondly, the step in step S105 becomes a step of performing defoaming on the mixed liquid, which is mixed in step S104. Thirdly, the step in step S106 becomes a step of performing filling where the mixed liquid on which the defoaming is performed in step S105 is filled. Fourthly, the step in step S108 becomes a step of gelling the mixed liquid in the flow passage unit, on which the defoaming is performed in step S107, by leaving the mixed liquid for a predetermined time period (12 hours, for example) at room temperature (20° C. to 30° C., for example).

Further, in the case where a mixed liquid of water and macromolecule which increases viscosity with the repetition of freezing and thawing is used as the pressure transmission medium 28, the manufacturing method according to the above-described modification is modified. That is, the step in step S108 becomes a step of gelling the mixed liquid filled in the flow passage unit with the repetition of freezing and thawing of the mixed liquid.

The manner of operation and advantageous effects obtained by this embodiment described heretofore will be described.

According to the flow passage unit 20 of this embodiment, the first flow passage part 21 and the one end of the flexible flow passage part 23 are coupled by the first coupling part 24 so that the first flow passage 20a and the third flow passage 20c are brought into a communicating state through the first coupling flow passage 20d. Further, the second flow passage part 22 and the other end of the flexible flow passage part 23 are coupled by the second coupling part 25 so that the second flow passage 20b and the third flow passage 20c are brought into a communicating state through the second coupling flow passage 20e. Each of the first flow passage 20a, the second flow passage 20b, the third flow passage 20c, the first coupling flow passage 20d, and the second coupling flow passage 20e is a flow passage having the same inner diameter of D1, and extending in a straight line. Accordingly, there is no space where liquid stagnates without flowing within the range from the inflow port 20A to the outflow port 20B so that no problem is caused, such as generation of bacteria or coagulation of the liquid.

Further, according to the flow passage unit 20 of this embodiment, the pressure of liquid flowing in the flexible flow passage part 23 is transmitted to the inner peripheral surface of the third flow passage 20c. The pressure transmitting space S1 is formed to surround the outer peripheral surface of the flexible flow passage part 23, and the pressure transmission medium 28 which is non-compressible is filled in this pressure transmitting space S1. The pressure transmission medium 28 is non-compressible so that, even in the case where the third flow passage 20c made of a flexible material is minutely deformed due to the pressure of the liquid, the volume of the pressure transmission medium 28 does not vary. Accordingly, the diaphragm 27 deforms with the deformation of the third flow passage 20c. In the state where the flow passage unit 20 is mounted on the pressure detection unit 10, the diaphragm 27 comes into contact with the diaphragm 12a and hence, a pressure corresponding to the deformation of the diaphragm 27 is transmitted to the diaphragm 12a. As described above, according to the flow passage unit 20 of this embodiment, the pressure of liquid flowing through the flow passage unit 20 can be transmitted to the pressure detection unit 10 with certainty.

According to the flow passage unit 20 of this embodiment, the second flow passage part 22 and the second coupling part 25 are integrally formed with each other, whereas the first flow passage part 21 and the first coupling part 24 are not integrally formed with each other. Accordingly, by mounting one end of the flexible flow passage part 23 on the first coupling part 24, and by mounting the other end of the flexible flow passage part 23 on the second coupling part 25, the second flow passage part 22, the flexible flow passage part 23, the first coupling part 24, and the second coupling part 25 can be formed into an assembly which is independent from the first flow passage part 21 and the body portion 26.

Further, by inserting the assembly into the insertion hole 26a, which is formed in the body portion 26, to mount the first coupling part 24 on the bottom portion 26b of the insertion hole 26a, the first flow passage part 21 and the flexible flow passage part 23 are brought into a state of being coupled by the first coupling part 24. By mounting the second coupling part 25 on the inlet portion 26c of the insertion hole 26a, the insertion hole 26a is closed so that the pressure transmitting space S1 becomes a closed space. As described above, according to the flow passage unit 20 of this embodiment, it is possible to realize, with a relatively easy and simple assembling operation, the state where the first flow passage 20a, the second flow passage 20b, and the third flow passage 20c are caused to communicate with each other, and the pressure transmitting space S1 is formed on the outer peripheral surface of the flexible flow passage part 23.

According to the flow passage unit 20 of this embodiment, the pressure transmission medium 28 can be filled in the pressure transmitting space S1 through the opening portion 26e formed in the body portion 26. Further, after the pressure transmission medium 28 is filled in the pressure transmitting space S1, it is possible to cause the pressure transmitting space S1 to become a closed space, which is separated from the external space S2, by sealing the opening portion 26e with the lid portion 29.

According to the flow passage unit 20 of this embodiment, the defoaming is performed on the pressure transmission medium 28 to be filled in the pressure transmitting space S1. The pressure transmission medium 28 does not include air bubbles so that when the flexible flow passage part 23 is deformed due to the pressure of liquid flowing through the third flow passage 20c, the displacement caused by the deformation is transmitted to the diaphragm 12a with certainty without being absorbed by the pressure transmission medium 28.

According to the method for manufacturing the flow passage unit 20 of this embodiment, the flexible flow passage part 23, the first coupling part 24, and the second coupling part 25 are formed into an assembly and, thereafter, the assembly is inserted into the insertion hole 26a of the body portion 26 so that it is possible to easily form the pressure transmitting space S1 which surrounds the outer peripheral surface of the flexible flow passage part 23. Further, defoaming is performed on the pressure transmission medium 28 by depressurizing the pressure transmitting space S1 in which the pressure transmission medium 28 is filled and hence, it is possible to transmit the pressure of liquid flowing through the third flow passage 20c to the diaphragm 12a with certainty without losing the pressure.

According to the method for manufacturing the flow passage unit 20 of this embodiment, the pressure transmission medium 28 having low viscosity can be easily filled in the pressure transmitting space S1 through the opening portion 26e formed in the body portion 26. Further, causing the viscosity of the pressure transmission medium 28 filled in the pressure transmitting space S1 to elevate can suppress the flowing-out of the pressure transmission medium 28 from the pressure transmitting space S1.

The embodiment of the present disclosure has been described heretofore. However, the present disclosure is not limited to the above-mentioned embodiment, and various modifications are conceivable without departing from the gist of Claims. The configurations of the above-mentioned embodiment may be partially omitted, or may be arbitrarily combined in a manner different from the above-mentioned configuration.

Figure 14:
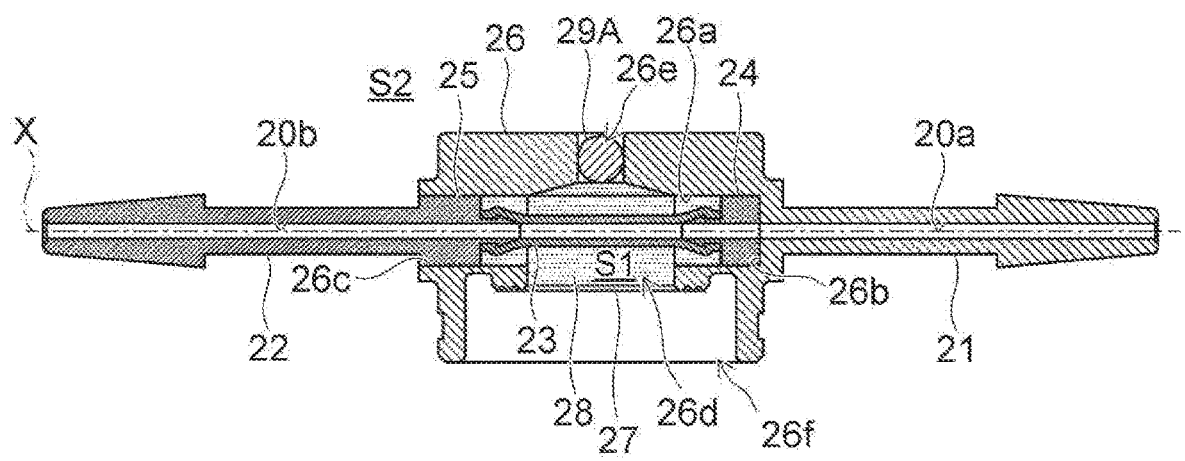
FIG. 14 is a view showing a first modification of the flow passage unit.

For example, in the above-mentioned description, the opening portion 26e of the body portion 26 is sealed with the lid portion 29 where the male thread is formed on the outer peripheral surface of the lid portion 29. However, another aspect may be adopted. For example, as shown in a first modification in FIG. 14, the opening portion 26e of the body portion 26 may be sealed with a sphere (sealing member) 29A made of a metal material, such as iron. In this case, a female thread is not formed on the inner peripheral surface of the opening portion 26e, and the inner diameter of the opening portion 26e is minutely smaller than the outer diameter of the sphere 29A. The operator seals the opening portion 26e by pressing the sphere 29A into the opening portion 26e, thus bringing the sphere 29A into a clearance fit state.

Figure 15:
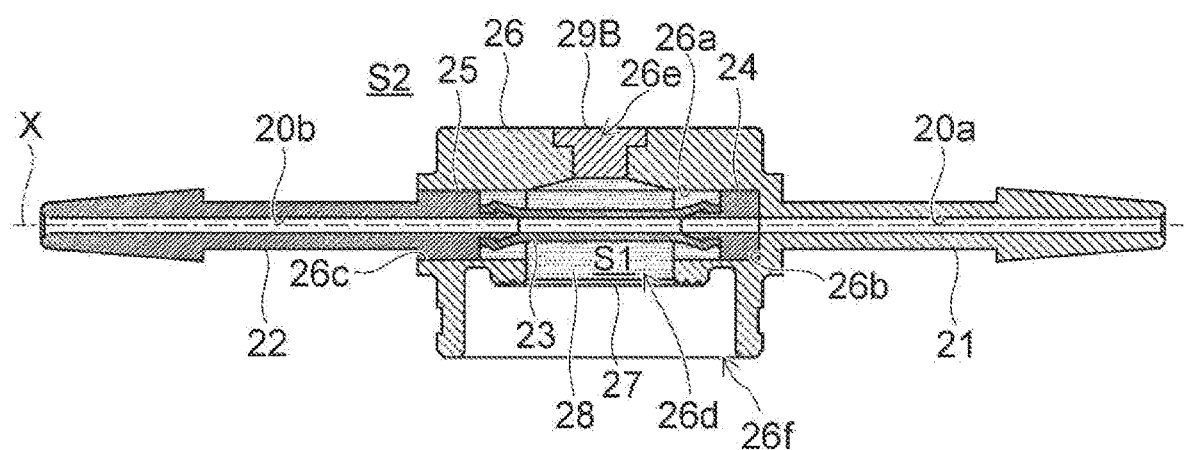
FIG. 15 is a view showing a second modification of the flow passage unit.

Further, for example, as shown in a second modification in FIG. 15, the opening portion 26e of the body portion 26 may be sealed with a lid portion (sealing member) 29B made of a resin material. In this case, a female thread is not formed on the inner peripheral surface of the opening portion 26e, and the inner diameter of the opening portion 26e is minutely smaller than the outer diameter of the lid portion 29B. The operator seals the opening portion 26e by putting the lid portion 29B into the opening portion 26e, thus bringing the lid portion 29B into a clearance fit state.

Figure 16:
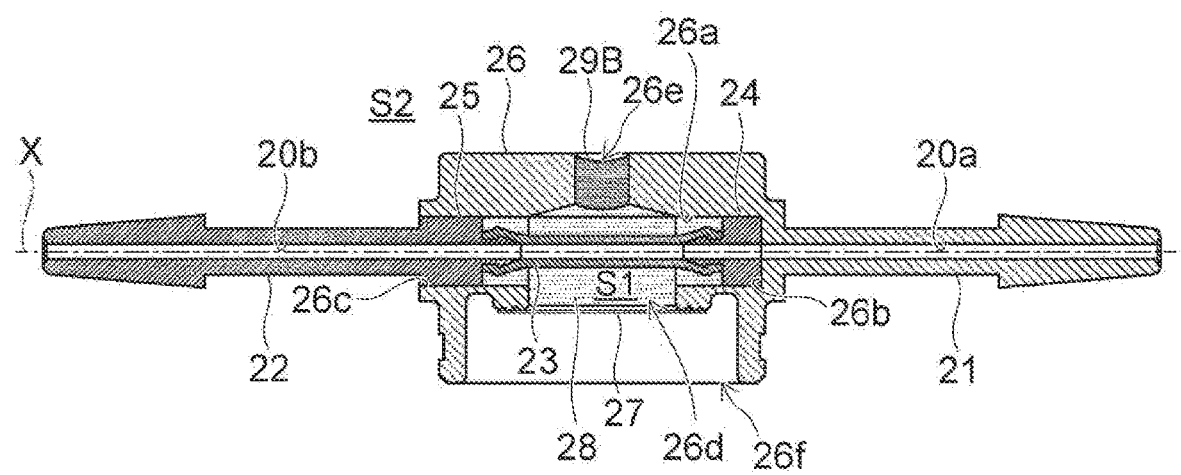
FIG. 16 is a view showing a third modification of the flow passage unit.

Further, for example, as shown in a third modification in FIG. 16, the opening portion 26e of the body portion 26 may be sealed by filling the opening portion 26e with an adhesive agent. In this case, a female thread is not formed on the inner peripheral surface of the opening portion 26e.

Further, in the above-mentioned description, the first flow passage 20a, the second flow passage 20b, the third flow passage 20c, the first coupling flow passage 20d, and the second coupling flow passage 20e have the same inner diameter in the entire region. However, another aspect may be adopted. For example, the inner diameter of the third flow passage 20c may be set to D1a (1 mm or more and 10 mm or less, for example), and the inner diameters of the first flow passage 20a, the second flow passage 20b, the first coupling flow passage 20d, and the second coupling flow passage 20e may be set to D1b (0.15 mm or more and less than 10 mm, for example) which is smaller than D1a.

What is claimed is:

1. A flow passage unit detachably mounted on a pressure detection unit which detects a pressure to be transmitted to a pressure detection part, the flow passage unit comprising:
   a flexible flow passage part including a flexible flow passage which introduces liquid, flowing in the flexible flow passage part from an inflow port, to an outflow port, and
   which is made of a flexible material;
   a body portion configured to form a pressure transmitting space which surrounds an outer peripheral surface of the flexible flow passage part;
   a pressure transmitting part mounted on the body portion and having a thin-film shape, one surface of the pressure transmitting part facing the pressure transmitting space, and the other surface of the pressure transmitting part being capable of coming into contact with the pressure detection part; and
   a pressure transmission medium filled in the pressure transmitting space, and being non-compressible, wherein
   the flexible flow passage is a flow passage which has a predetermined inner diameter, and which extends in a straight line along an axis.

2. The flow passage unit according to claim 1, comprising:
   a first flow passage part including a first flow passage which communicates with one of either the inflow port or the outflow port;
   a second flow passage part including a second flow passage which communicates with the other of either the inflow port or the outflow port;
   a first coupling part including a first coupling flow passage which couples the first flow passage part and one end of the flexible flow passage part, and which causes the first flow passage and the flexible flow passage to communicate with each other; and
   a second coupling part including a second coupling flow passage which couples the second flow passage part and the other end of the flexible flow passage part, and which causes the second flow passage and the flexible flow passage to communicate with each other, wherein
   each of the first flow passage, the second flow passage, the first coupling flow passage, and the second coupling flow passage is a flow passage which has the predetermined inner diameter, and which extends in a straight line along the axis.

3. The flow passage unit according to claim 2, wherein
   the first flow passage part and the body portion are integrally formed with each other,
   the second flow passage part and the second coupling part are integrally formed with each other,
   the body portion has an insertion hole extending along the first flow passage, and having a bottom portion on the first flow passage side,
   the first coupling part is mounted on the bottom portion of the insertion hole, and
   the second coupling part is mounted on an inlet portion of the insertion hole.

4. The flow passage unit according to claim 1, wherein
   the body portion has an opening portion for causing an external space and the pressure transmitting space to communicate with each other, and for filling the pressure transmission medium in the pressure transmitting space, and
   the opening portion is sealed with a sealing member in a state where the pressure transmission medium is filled in the pressure transmitting space.

5. The flow passage unit according to claim 1, wherein the pressure transmission medium on which defoaming is performed is filled in the pressure transmitting space.

6. A pressure detection device comprising:
   the flow passage unit according to claim 1;
   a pressure detection unit configured to detect a pressure to be transmitted from the pressure transmitting part to the pressure detection part; and
   a mounting mechanism configured to detachably mount the flow passage unit on the pressure detection unit.

* * * * *